(12) United States Patent
Smith et al.

(10) Patent No.: US 12,572,185 B2
(45) Date of Patent: Mar. 10, 2026

(54) COMPUTING DEVICE WITH BAR WITH ADJUSTABLE PORT END

(71) Applicant: Lenovo (Singapore) Pte. Ltd., Singapore (SG)

(72) Inventors: Madison Smith, Santa Rosa, CA (US); Yoshihito Nakagaki, Yokohama (JP); Cuong Truong, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 205 days.

(21) Appl. No.: 18/378,047

(22) Filed: Oct. 9, 2023

(65) Prior Publication Data

US 2025/0117052 A1 Apr. 10, 2025

(51) Int. Cl.
*G06F 1/16* (2006.01)
*G06F 13/42* (2006.01)

(52) U.S. Cl.
CPC .......... *G06F 1/1684* (2013.01); *G06F 1/1616* (2013.01); *G06F 1/1681* (2013.01); *G06F 13/4282* (2013.01)

(58) Field of Classification Search
CPC .... G06F 1/1684; G06F 1/1616; G06F 1/1681; G06F 13/4282; G06F 1/1656; G06F 1/166
See application file for complete search history.

(56) References Cited

U.S. PATENT DOCUMENTS

2014/0111926 A1* 4/2014 Reid ........................ H05K 3/00
29/829

OTHER PUBLICATIONS

Fujitsu Limited—Tube (year 2021) archive.org snap provided from Dec. 2022 (Year: 2021) https://junichiroyokota.com/works/tube.html.*

* cited by examiner

*Primary Examiner* — Allen L Parker
*Assistant Examiner* — Dakota M Talbert
(74) *Attorney, Agent, or Firm* — Brian J. Pangrle

(57) ABSTRACT

A computing device can include a processor; memory accessible to the processor; a display housing that includes a display operatively coupled to the processor; a base housing that includes a base side, a top side, a front edge, a back edge, a left edge, and a right edge; a hinge assembly that couples the base housing and the display housing; and a bar mountable to the base side of the base housing, where the bar includes one or more feet and an adjustable port end that includes one or more ports.

20 Claims, 8 Drawing Sheets

100

| CPU(s) 112 | Memory 114 |
| NI(s) 116 | Power 118 |

144

148

128

140 dx dy dy2

141 z
y
x dy1

124

200

120

190

122

142

126

146

121

143

140

φ

133

123

130

131

120

200

190

141 dz

222

224

140

216 dz4

214 dz2

212

210

211 dyb dzb

200

120

COMPUTING DEVICE WITH BAR WITH ADJUSTABLE PORT END

TECHNICAL FIELD

Subject matter disclosed herein generally relates to technology for computing devices.

BACKGROUND

A computing device can include two portions that may be coupled via a hinge assembly where, for example, the two portions may include a base portion and a display portion that can be rotatable via the hinge assembly. In such an example, the computing device may be a clamshell computing device that can be transitioned from a closed position to an open position. A computing device can include one or more ports, for example, for data, power or power and data.

SUMMARY

A computing device can include a processor; memory accessible to the processor; a display housing that includes a display operatively coupled to the processor; a base housing that includes a base side, a top side, a front edge, a back edge, a left edge, and a right edge; a hinge assembly that couples the base housing and the display housing; and a bar mountable to the base side of the base housing, where the bar includes one or more feet and an adjustable port end that includes one or more ports. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figures 1A, 1B, 1C:
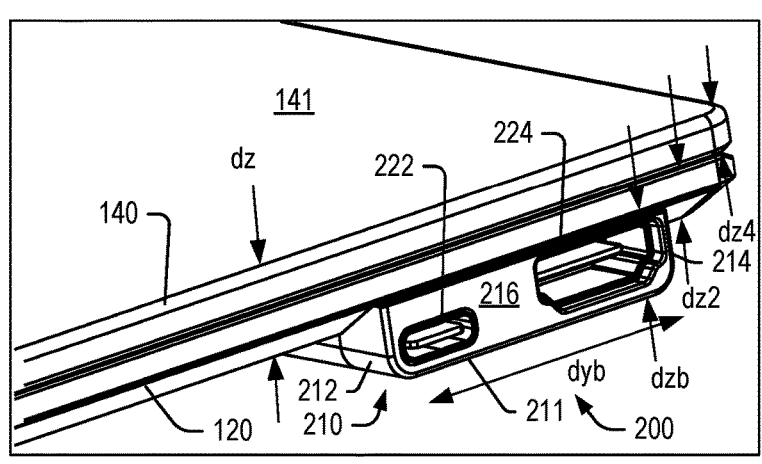
FIG. 1A, FIG. 1B, and FIG. 1C are diagrams of an example of a computing device.

FIG. 1A, FIG. 1B and FIG. 1C show an example of a computing device 100 (e.g., a computing system) that includes a base housing 120 and a display housing 140 that are pivotable with respect to each other via movement about one or more hinge assemblies 130. The computing device 100 may be a system such as, for example, a computing system (e.g., an information handling device, an information handling system, etc.).

As an example, the computing device 100 may include one or more processors 112, memory 114 (e.g., one or more memory devices), one or more network interfaces (NIs) 116, and one or more power cells 118. Such components may be, for example, housed within the base housing 120, the display housing 140, or the base housing 120 and the display housing 140.

As shown, the base housing 120 includes a base side 121, a top side 123, a front edge 122, a back edge 124, a right edge 126 and a left edge 128, where left and right may be defined by left and right hands of a user when the front edge 122 is closest to the user. As shown, the display housing 140 includes a back side 141, a display side 143, a front edge 142, a back edge 144, a right edge 146 and a left edge 148, where left and right may be defined by left and right hands of a user when the front edge 122 of the base housing 120 is closest to the user. As shown, the display housing 140 may include a front edge unit 190 that may be utilized for one or more purposes.

FIG. 1A shows a Cartesian coordinate system with an x-axis, a y-axis and a z-axis that may be used to define x, y and z coordinates of various features of the computing device 100. As shown, various widths may be defined via the x-axis, various depths may be defined via the y-axis and various thicknesses and/or heights may be defined via the z-axis. As shown, the computing device 100 may include a width dx, a depth dy and a thickness dz.

As an example, the computing device 100 may be defined using two or more coordinate systems, for example, consider a first coordinate system that may be used to define the base housing 120 and a second coordinate system that may be used to define the display housing 140. In such an example, a first Cartesian coordinate system may have a width along an x-axis $(x_1)$, a depth along a y-axis $(y_1)$ and a height or thickness along a z-axis $(z_1)$ that extends in a direction outwardly away from the top side 123 of the base housing 120 where the top side 123 may be a keyboard side with a keyboard of keys (e.g., consider a QWERTY keyboard). As to a second Cartesian coordinate system, it may be used to define the display housing 140 and include a width along an x-axis $(x_2)$, a depth along a y-axis $(y_2)$ and a height or thickness along a z-axis $(z_2)$ that extends in a direction outwardly away from the display side 143 of the display housing 140. As an example, a coordinate system may be right-handed or left-handed. While various Cartesian coordinate systems are mentioned, a cylindrical or other type of coordinate system may be utilized, for example, consider a cylindrical coordinate system with a longitudinal axis that is aligned with a pivot axis of the hinge assembly 130, noting that a hinge assembly may include multiple pivot axes (e.g., consider a dual axis hinge).

As shown in FIG. 1B, the display housing 140 may pivot via the one or more hinge assemblies 130 with respect to the base housing 120 such that an angle φ exists between the base housing 120 and the display housing 140. As shown, an open angle of the display housing 140 with respect to the base housing 120 may be greater than 0 degrees and at least 110 degrees. As an example, the open angle may be as great as 180 degrees or more. As an example, the angle φ may be an azimuthal coordinate of a cylindrical coordinate system where a longitudinal axis coincides with a pivot axis of a hinge assembly or hinge assemblies.

As shown, the computing device 100 can include a bar 200 mountable to the base side 121 of the base housing 120, where the bar 200 includes one or more feet and an adjustable port end 216 that includes one or more ports 222 and 224. As an example, the adjustable port end 216 may be part of a translatable unit 210 that may translate generally in a direction of a pivot axis of the hinge assembly 130. As shown, the translatable unit 210 can include a base side 211, a front side 212 and a back side 214.

As shown in FIG. 1A, the bar 200 may be mounted a distance dy1 from the front edge 122 of the base housing 120 and a distance dy2 from the back edge 124 of the base housing 120. As shown in FIG. 1C, the bar 200 may have a depth dyb between the front side 202 and the back side 204, which may be sufficient for accommodating one or more of the one or more ports 222 and 224. As shown in FIG. 1C, the bar 200 may have a thickness dzb, which may be sufficient for accommodating one or more of the one or more ports 222 and 224. As shown, the base housing 120 may include a thickness dz2 and the display housing 140 may include a thickness dz4 where, for example, dzb may be greater than dz2, which may be greater than dz4. For example, consider dzb>dz2>dz4.

As shown in FIG. 1B, the bar 200 can provide for a clearance as to the display housing 140. For example, the bar 200 can be displaced the distance dy2 from the back edge 124 of the base housing 120 where the bar 200 provides for elevating the back edge 124 a distance from a support surface (see, e.g., dz2 and dzb) where, by elevating the back edge 124, the display housing 140 can rotate about a rotational axis 131, which may be a hinge assembly axis, such that the back edge 144 of the display housing 140 does not contact the support surface when rotating the display housing 140 from approximately 0 degrees (e.g., closed clamshell) to approximately 180 degrees (e.g., open, flat clamshell). As an example, the one or more hinge assemblies 130 may include one or more axles and one or more bores or bushings. For example, the display housing 140 can include a portion of a hinge assembly that may include a bore or bushing 133 that may define the rotational axis 131. As an example, the base housing 120 may include one or more axles that can be received by such a bore or bushing 133, noting that more than one bore or bushing may be included as a portion or portions of the one or more hinge assemblies 130, which may be portions of the display housing 140 (e.g., integral to the display housing 140 and/or coupled to the display housing 140).

In various instances, thickness of a computing device may be a sum of a keyboard housing thickness and a display housing thickness. In general, a display housing may have a thickness that is less than that of a keyboard housing. In such an approach, various types of components may be housed in the keyboard housing where a volume and a mass of the keyboard housing exceeds that of a display housing. In such an approach, the keyboard housing may help to stabilize a computing device when the display housing is positioned at an open angle. For example, at an open angle of approximately 110 degrees of a display housing with respect to a keyboard housing, the mass of the keyboard housing may be sufficient to prevent the computing device from tipping backwards.

As to whether or not a computing device will be stable at a particular open angle can depend on a variety of factors. For example, consider center of mass of the base housing 120 and/or an angle of the base housing 120 as supported on a support surface (e.g., a desktop, a countertop, a tabletop, etc.), which may be substantially horizontal. In such an example, an increase in the angle where the back edge 124 is higher than the front edge 122 may provide for increased stability when the display housing 140 is open with respect to the base housing 120. While an option may be to shift a center of mass of the base housing 120 toward the front edge 122 to create a longer lever arm to combat gravity induced torque of an opened display housing 140, such an approach may make the computing device 100 relatively unbalanced when carried by a user. For example, a user may wish to carry the computing device 100 with a hand cupping the back edges 124 and 144 of the base housing 120 and the display housing 140 when the computing device 100 is in a closed position (e.g., angle Δ of approximately 0 degrees). In such an example, the computing device 100 may be more stable in the hand of the user when the center of mass is closer to the back edges 124 and 144 (e.g., the center of mass of the base housing 120 is closer to the back edge 124 than to the front edge 122).

As an example, the bar 200 may be mounted to the base housing 120 in a detachable or integrated manner whereby a mass of the bar 200 acts to shift a center of mass of the base housing 120 (e.g., with the bar 200) toward the back edge 124. Further, the bar 200 may be utilized as a finger grip, which may further stabilize the computing device 100 when held in a hand of a user (e.g., cupped within a hand with the back edges 124 and 144 resting in a palm and/or a number of fingers near the metacarpophalangeal (MCP) joints of the hand).

As an example, the bar 200 may provide for elevating the base housing 120 near its back edge 124 when the computing device 100 is positioned on a support surface (e.g., a horizontal support surface, etc.). As an example, the bar 200 may provide multiple functions that can make the computing device 100 more stable when positioned on a support surface and/or when carried in the hand of a user. As an example, the inclusion of the bar 200 may allow for making the base housing 120 thinner along one or more portions, which may help to contribute to an overall reduction in mass of the computing device 100. As an example, the base housing 120 may be of approximately the same thickness as the display housing 140 at one or more positions along the y-coordinate. For example, consider the two housings 120 and 140 as having approximately the same thickness along the distance dy1. In such an example, the thicknesses may be within approximately 20 percent of one another, approximately 15 percent of one another, approximately 10 percent of one another, approximately 5 percent of one another, approximately 1 percent of one another, etc.

As shown in FIG. 1C, the one or more ports 222 and 224 can include one or more serial ports. For example, consider one or more USB types of ports. As shown, the port 222 maybe a USB-C type of port and the port 224 may be a different type of serial port, which may be a High Definition Multimedia Interface (HDMI) port or an Ethernet port (e.g., RJ45, etc.); noting that one or more other USB types of ports may be utilized (e.g., USB-A, USB-B, USB-mini, USB-micro, etc.). The HDMI port as well as a DisplayPort, which may be included as a type of port, are both serial interfaces for transmission of at least digital video; noting that an analog interface (e.g., VGA, S-video, RGB, etc.) may be included as a type of port.

As an example, the thickness of the base housing 120 along the display distance dy1 may be less than a thickness of one or more types of serial ports. For example, a plug or male HDMI connector (e.g., type A) may have outer dimensions of 1.39 cm by 0.445 cm, while the female port may have inside dimensions of 1.4 cm by 0.455 cm.

As another example, consider a USB-A type connector that may be specified as having a length of 1.4 cm and a height of 0.65 cm. As such a port (e.g., a receptacle) may be expected to have a height that is greater than 0.65 cm. In the example of FIG. 1C, the height dzb of the bar 200 may be greater than approximately 0.85 cm to accommodate a port that may be a USB-A type of port that can receive a USB-A type connector.

As to a USB-C type of port or receptacle, it may be approximately 0.84 cm wide, approximately 0.26 cm high, and approximately 0.665 cm deep. As an example, a USB-C type connector may be usable in one of two orientations (e.g., a symmetric connector); whereas, a USB-A type of connector may be usable in a single orientation (e.g., an asymmetric connector). As mentioned, the port 222 may be a USB-C port, which may have a thickness of approximately 0.26 cm.

As an example, by positioning one or more ports in the bar 200, the base housing 120 may be made thinner along other portions. As an example, the bar 200 may be customizable via selection of the translatable unit 210 from various translatable units and/or selectable from one or more types of bars with different features, which may include different ports, arrangements of ports, etc.

As an example, the bar 200 may provide for housing one or more types of features, which can include circuitry, which may include battery circuitry (e.g., a battery or batteries as a type of circuitry) and/or other circuitry. As explained, the bar 200 can provide for input and/or output (I/O) for the computing device 100. As explained, such an approach may allow for not including I/O on a side edge of the base housing 120 such that the base housing 120 may be made slimmer along various portions. As an example, the bar 200 may provide for an arrangement of mass of various components to be distributed in an improved manner for one or more purposes. As an example, the bar 200 may be of a height that can accommodate various types of I/O (e.g., ports, etc.). As an example, the bar 200 may provide for housing a motherboard of the computing device 100 and/or a daughterboard of the computing device 100. As explained, the translatable unit 210 may be selectable from a group of different translatable units with one or more different features. As an example, the translatable unit 210 may be a type of dongle, which may include, for example, one or more security features (e.g., a security key, security circuitry, etc.). As an example, the translatable unit 210 may include one or more memory components and/or a port for one or more memory components (e.g., an SD card port, etc.).

As explained, the computing device 100 may include the one or more processors 112, the memory 114 (e.g., as accessible to at least one processor of the one or more processors 112); the display housing 140 that includes a display (e.g., display circuitry operatively coupled to at least one of the one or more processors 112); the base housing 120 that includes the base side 121, the top side 123, the front edge 122, the back edge 124, the left edge 128, and the right edge 126; the hinge assembly 130 that couples the base housing 120 and the display housing 140; and the bar 200 mountable to the base side 121 of the base housing 120, where the bar 200 can include one or more feet and an adjustable port end 206 that includes the one or more ports 222 and 224, which may be one or more types of ports.

Figure 2A:
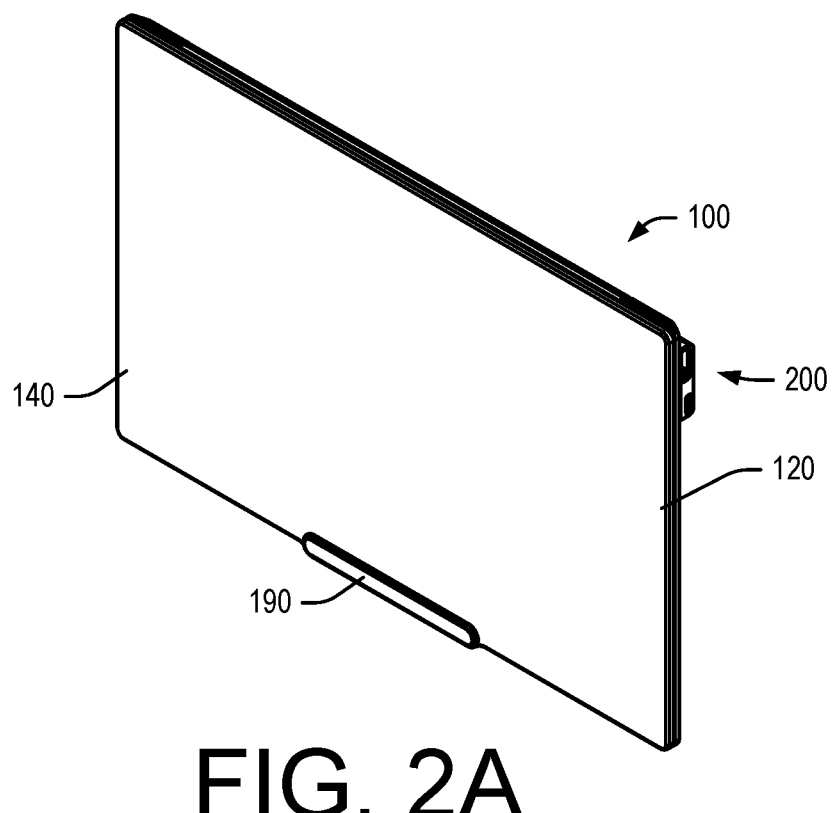
FIG. 2A and FIG. 2B are perspective views of an example of a computing device.
Figure 2B:
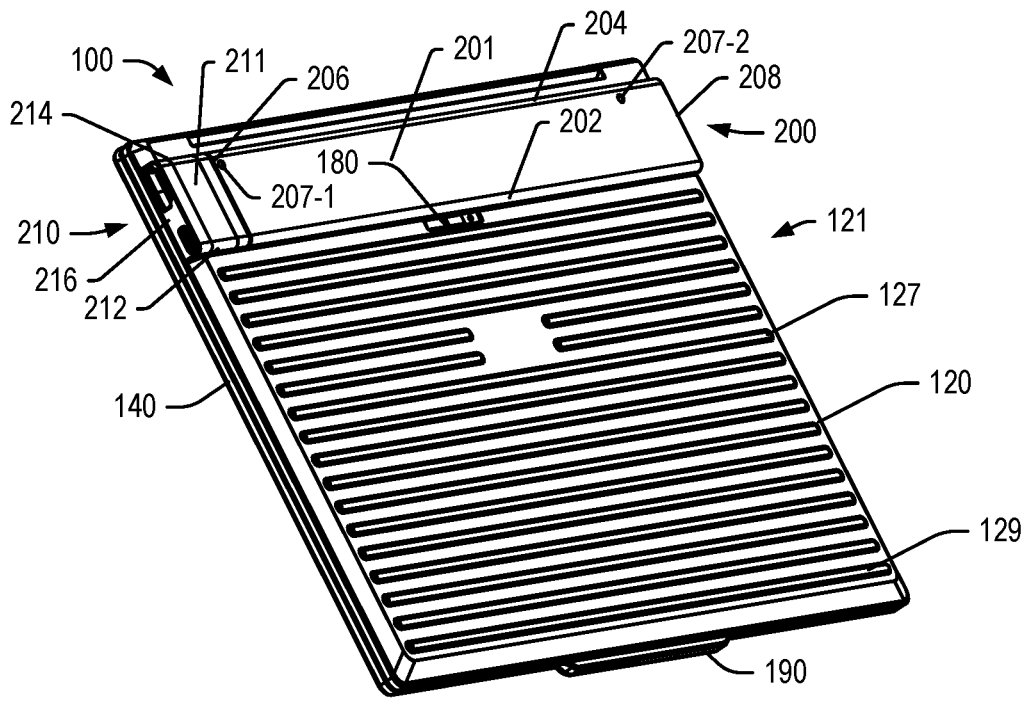

FIG. 2A and FIG. 2B show perspective views of the computing device 100 as including the bar 200. As shown, the bar 200 extends from the back side 121 of the base housing 120 of the computing device 100. In FIG. 2B, the bar 200 is shown as including a base side 201, a front side

202, a back side 204, an inset end 206, an opposing end 208, and one or more feet 207-1 and 207-2. As explained, the bar 200 may include and/or removably receive the translatable unit 210 that includes the front side 212, the back side 214 and the base side 211. For example, the inset end 206 of the bar 200 may include one or more features for receiving the translatable unit 210 that can provide the one or more ports 222 and 224. In the example of FIG. 2B, the one or more feet 207-1 and 207-2 can include a foot or feet that is positioned proximate to the inset end 206. For example, consider a foot or feet that may be positioned approximately at or within 3 cm of the inset end 206. In the example of FIG. 2B, the one or more feet 207-1 and 207-2 may be positioned at a substantially common distance from an edge of the base housing 120, which may provide for a more balanced support of the base housing 120. For example, the substantially common distance may be measured from a left side and from a right side of respective left side foot and of a respective right side foot. As to a substantially common distance, the distances may be within plus or minus 15 percent of one another.

In the example of FIG. 2B, the translatable unit 210 with the adjustable port end 216 is shown as being a right side feature while the opposing end 208 of the bar 200 is shown as being a left side feature. As an example, a bar may include a right side adjustable port end and/or a left side adjustable port end.

As an example, the back side 121 may include various features 127 and 129, which may provide for one or more of mechanical strength, improved grip, support, and enhanced heat transfer. For example, the back side 121 of the base housing 120 may include one or more ribs or other structural features that may provide for one or mechanical strength, improved grip, support, and enhanced heat transfer. For example, the back side 121 can include a number of ribs that extend widthwise and/or lengthwise. As an example, one or more front-most ribs may provide for support, for example, as a foot or feet to support the base housing 120 on a support surface.

As shown in FIG. 2B, the feature 129 may be a front-most feature that may act as a foot or feet to support the base housing 120 on a support surface. As an example, the base housing 120 may be supported on a support surface via the one or more feet 207-1 and 207-2 and the feature 129. As explained, the bar 200 can have a thickness that is greater than a thickness of the base housing 120. In such an approach, when positioned on a support surface, the base housing 120 may be disposed at an angle where the back edge 124 is elevated a distance that is greater than that of the front edge 122. As explained, such an angle may help to stabilize the computing device 100 when the display housing 140 is in an open position at an open angle. And, for example, the angle may provide for improved ergonomics for utilization of one or more features of the base housing 120 by one or more hands of a user (e.g., consider use of a touch pad, a keyboard, etc., of the base housing 120).

As an example, the bar 200 may be removably mountable to the base housing 120 of the computing device 100. For example, the base housing 120 can include a latch 180 that may be a tool-less, hand operable latch or, for example, a tool-based latch where a tool such as a pin, a screwdriver, a wrench, etc., may be utilized to release the latch 180 and/or to actuate the latch 180. In the example of FIG. 2B, the latch 180 is positioned proximate to the front side 202 of the bar 200, for example, approximately mid-way between the right and right edges 126 and 128 of the base housing 120; noting that it may be located at another position.

As explained, the display housing 140 may include the front edge unit 190 that may be utilized for one or more purposes. For example, the unit 190 may be utilized as a finger grip for opening the computing device 100 to position the display housing 140 at a desired open angle with respect to the base housing 120. As an example, the unit 190 may include one or more media related features such as, for example, one or more cameras (e.g., forward and/or backward facing), one or more microphones, one or more lights (e.g., flashes, video lights, etc.), etc. In such an approach, the thickness of the display housing 140 may be made thinner as various components may be housed at least in part in the unit 190 which may provide the display housing 140 with a greater thickness over an extent of the unit 190 (e.g., consider a greater thickness of 105 percent to 200 percent of dz4). Referring to the example of FIG. 1B, the unit 190 may be of a thickness that provides for supporting the display housing 140 in a substantially horizontal position when the display housing 140 is open to approximately 180 degrees with respect to the base housing 120 (e.g., noting that the base housing 120 may be slightly sloped downwardly from the back edge 124 to the front edge 122). In such an example, the unit 190 may operate as a foot and/or bumper that may protect the display housing 140. As an example, a surface of the unit 190 may be made from a material that provides for absorption of shock, anti-slip, etc. For example, the unit 190 may be made at least in part from an elastomeric material (e.g., polymer, etc.) that can provide for one or more of shock absorption, finger grip, anti-slip on a support surface, etc.

Figure 3A:
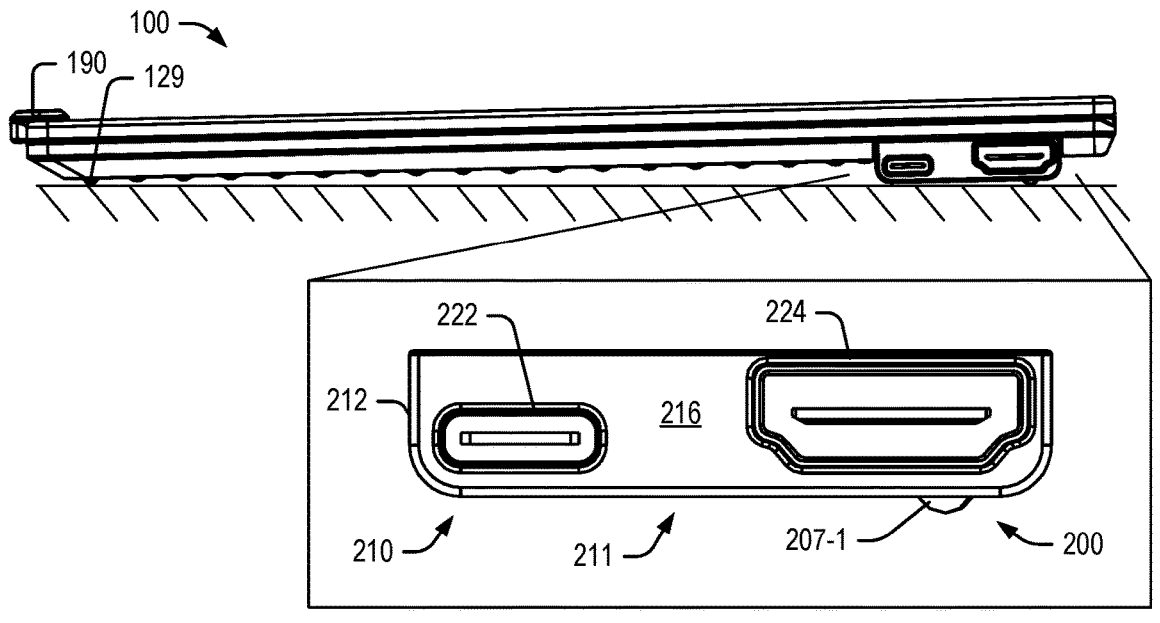
FIG. 3A and FIG. 3B are side views of an example of a computing device.
Figure 3B:
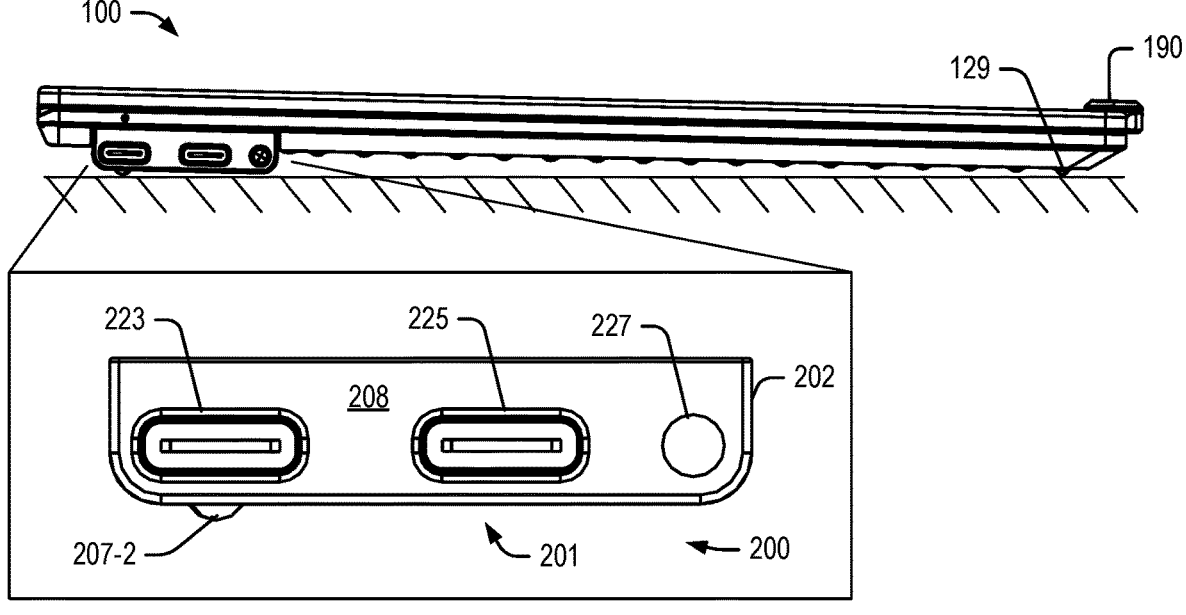

FIG. 3A and FIG. 3B show examples of the computing device 100 where the bar 200 includes the adjustable port end 216 as a right end and the end 208 as a left end of the bar 200 as another port end 208. As shown, the computing device 100 may be disposed at an angle on a support surface via the feature 129 and the one or more feet 207-1 and 207-2. For example, consider an angle within a range of approximately 0.5 degrees to approximately 5 degrees. As mentioned, in an open position of the display housing 140 of approximately 180 degrees, the base housing 120 may slope slightly downward (e.g., in a range of approximately 0.5 degrees to approximately 5 degrees). As shown, the height of the one or more feet 207-1 and 207-2 may provide for a clearance between the bar 200 and the support surface. In such an approach, the bar 200 may not contact the support surface and hence not be damaged by the support surface (e.g., scuffed, scratched, etc.). In such an approach, the height of the feature 129 may be sufficient to help assure that the clearance (e.g., gap) is provided at or near a corner of the front side 202 and the base side 201 of the bar 200. Similarly, the clearance (e.g., gap) may provide for translation of the translatable unit 210 while the base housing 120 is supported on a support surface. For example, if a corner at the front side 212 and the base side 211 of the translatable unit 210 was in contact with the support surface, such contact may hinder translation and/or cause wear (e.g., damage) to the translatable unit 210.

In FIG. 3A and FIG. 3B, the bar 200 and the unit 210 may have a cross-sectional profile that includes one or more straight and/or one or more curved portions. As an example, a cross-section may be substantially rectangular, circular, elliptical, etc. As an example, a cross-section may be a portion of a circle, a portion of an ellipse, etc. For example, consider a semi-circular cross-section, a semi-elliptical cross-section, etc. As an example, a cross-section may be defined by one or more dimensions that can accommodate at least one port where, for example, multiple ports, if present, may be aligned along one of the dimensions (e.g., side-by-side). Depending on cross-section shape and one or more dimensions, multiple ports, if present, may be stacked and/or side-by-side. For example, consider a semi-circular cross-sectional profile with a smaller port at the bottom (e.g., USB-C) and a larger port (e.g., HDMI) stacked above the smaller port.

In the views of FIG. 3A and FIG. 3B, the front edge unit 190 is shown as extending outwardly, backwardly from the back side 141 of the display housing 140 and as extending outwardly, frontwardly from the front edge 142 of the display housing 140. As explained, the unit 190 may provide a finger grip, which may facilitate opening of the display housing 140 of computing device 100. And, as explained, one or more components may be housing at least in part in the unit 190.

Figures 4A, 4B:
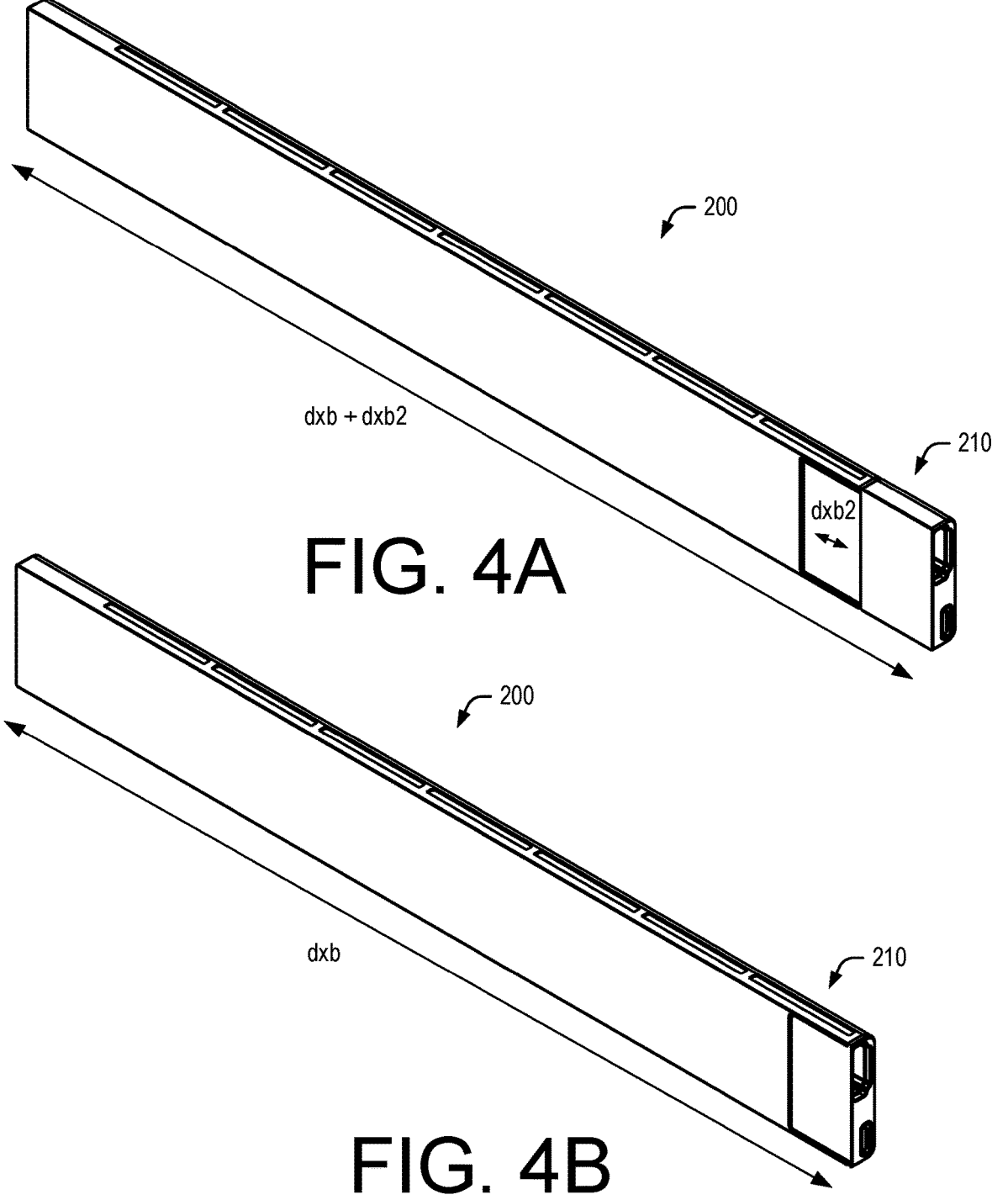
FIG. 4A and FIG. 4B are perspective views of an example of a bar mountable to a computing device.

FIG. 4A and FIG. 4B show perspective views of the bar 200 with respect to translation of the translatable unit 210, which may be translated outwardly and inwardly, for example, by a distance dxb2 where, when translated fully inwardly, the bar 200 may have a width of dxb. Hence, the bar 200 with the translatable unit 210 may have a width of dxb to dxb plus dxb2.

Figure 5A:
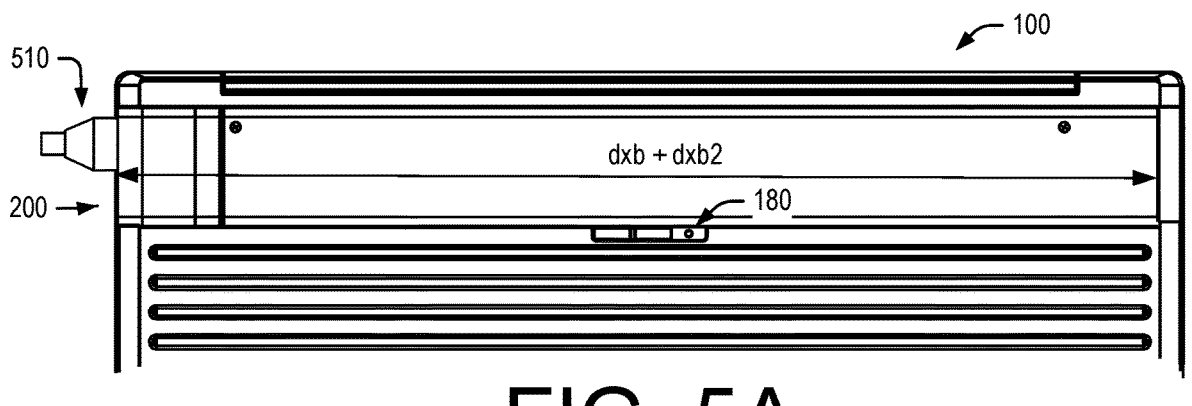
FIG. 5A, FIG. 5B, and FIG. 5C are plan of an example of a portion of a computing device.
Figure 5B:
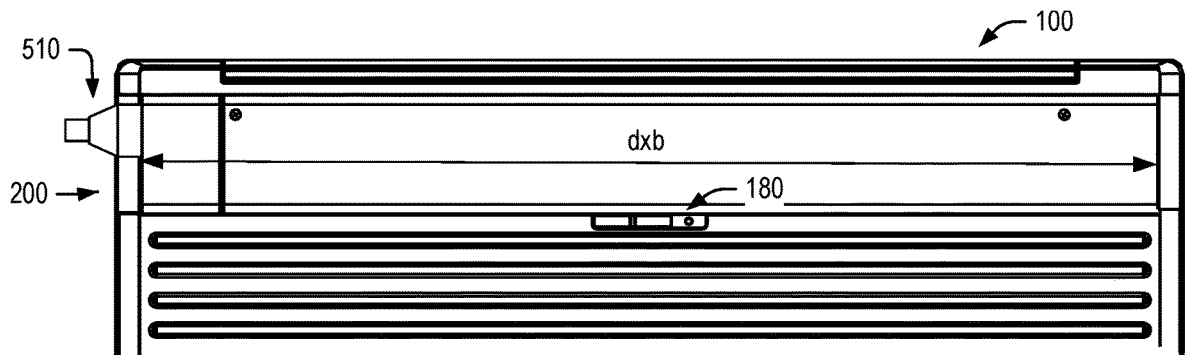
Figure 5C:
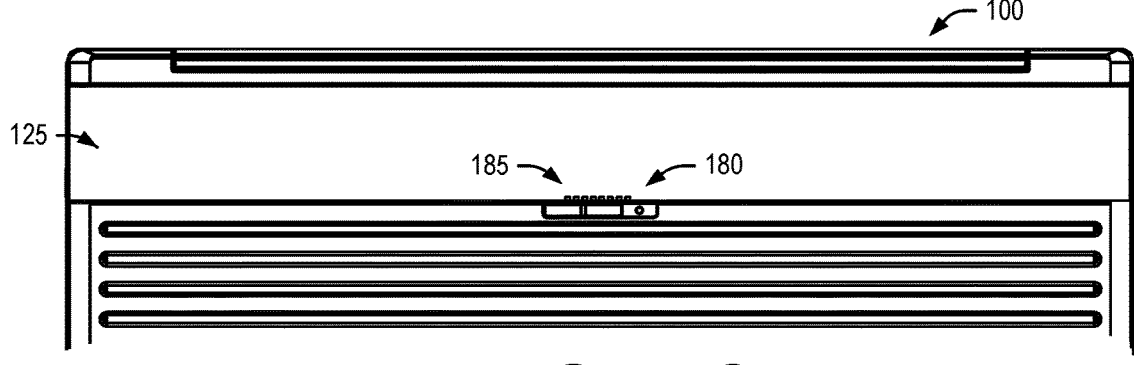

FIG. 5A and FIG. 5B show plan views a portion of an example of the computing device 100 with the bar 200 with respect to translation of the translatable unit 210 with a connector 510 inserted into one of the one or more ports 222 and 224 and FIG. 5C shows the portion of the example of the computing device 100 without the bar 200, noting that one or more interfaces may be present as part of the computing device 100 to operatively couple circuitry of the bar 200 and circuitry of the base housing 120.

As an example, a connector may have a thickness that does not allow for the connector to move inwardly with the translatable unit 210 due to space constraints. As an example, a connector may have a thickness that does allow for the connector to move inwardly with the translatable unit 210. For example, an HDMI video connector may be relatively thick (e.g., due to overmolding support, etc.) and demand that the translatable unit 210 is in an extended position such that space exists to accommodate the HDMI video connector; whereas, for example, a USB-C type of connector may be thinner and received by a port of the translatable unit 210 in either an extended position or a retracted position.

As shown in FIG. 5C, the base housing 120 can include a recess 125 that can receive at least a portion of the bar 200 where the recess 125 may include an interface 185, for example, proximate to the latch 180. As an example, the interface 185 may be an electrical contact interface that may utilize one or more features such as, for example, spring loaded contacts (e.g., pogo-pins, etc.). As an example, the interface 185 may be actuatable via a position of the latch 180 such that, for example, the interface 185 depends on position of the latch 180 for making electrical contact with an interface of the bar 200 (e.g., consider an electrical contact interface, etc.).

Figure 6A:
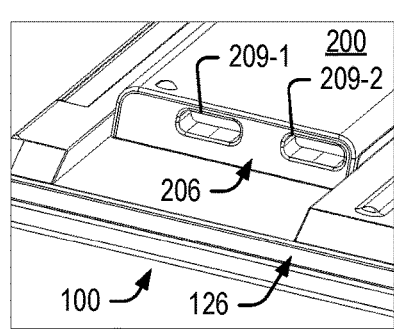
FIG. 6A, FIG. 6B, FIG. 6C, and FIG. 6D are diagrams of various examples of components of a computing device.
Figure 6A:
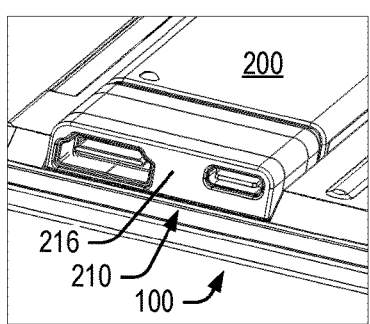
Figure 6A:
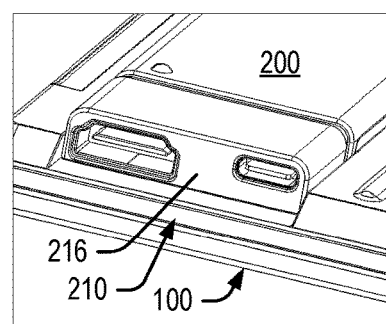

FIG. 6A shows a series of illustrations of the computing device 100 with the bar 200 and without the translatable unit 210 (left), with the translatable unit 210 in an extended position (middle), and with the translatable unit 210 in a retracted position (right), respectively. As shown, in the extended position, the adjustable port end 216 may be substantially even with the right edge 126 of the base housing 120; whereas, in the retracted position, the adjustable port end 216 is recessed a distance from the right edge 126 of the base housing 120. As shown in FIG. 6A, without the translatable unit 210, the end 206 of the bar 200 can include one or more connection features 209-1 and 209-2, which may provide for one or more of power and data, on a port-by-port or other basis with respect to the one or more ports 222 and 224 of the translatable unit 210. As an example, multiplexer circuitry may be provided where, for example, a single connection features can operate to serve multiple ports.

As an example, in an extended position, the translatable unit 210 may provide space for receipt of an HDMI connector and/or a USB-A type connector, each of which may have a surrounding housing (e.g., molded plastic, etc.) that secures the electronic components of such types of the connectors. As an example, a surrounding housing may be an overmolded type of surrounding material that effectively enlarges one or more dimensions of at least a portion of a connector. In such an example, a translatable unit may provide for translating outwardly in a manner that provides space to accommodate overmolding of a connector.

Figure 6B:
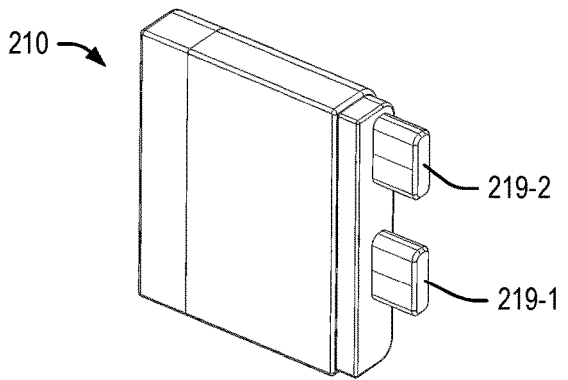

FIG. 6B shows a perspective view of an example of the translatable unit 210 as including one or more connection features 219-1 and 219-2 that may mate with the one or more connection features 209-1 and 209-2 of the bar 200. As an example, the connection features may be USB-C type of features.

Figure 6C:
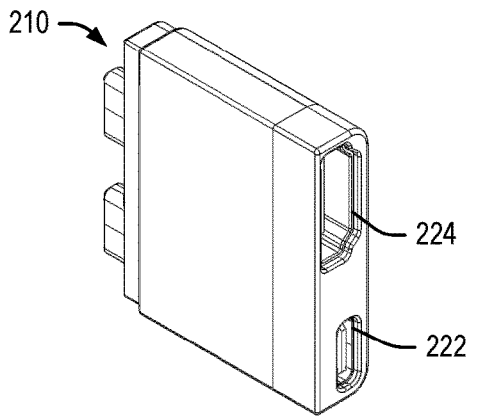
Figure 6C:
Figure 6D:
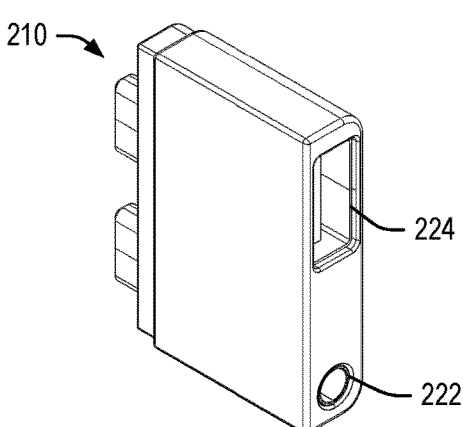

FIG. 6C and FIG. 6D show perspective views of examples of the translatable unit 210, which can include the one or more ports 222 and 224, which may be of one or more types, one or more combinations, etc. For example, in FIG. 6C, the port 222 is shown as an USB-C type of port and the port 224 is shown as an HDMI type of port, while in FIG. 6D, the port 222 is shown as a cylindrical pin port (e.g., audio port, power port, etc.) and the port 224 is shown as an USB-A type of port.

Figure 7:
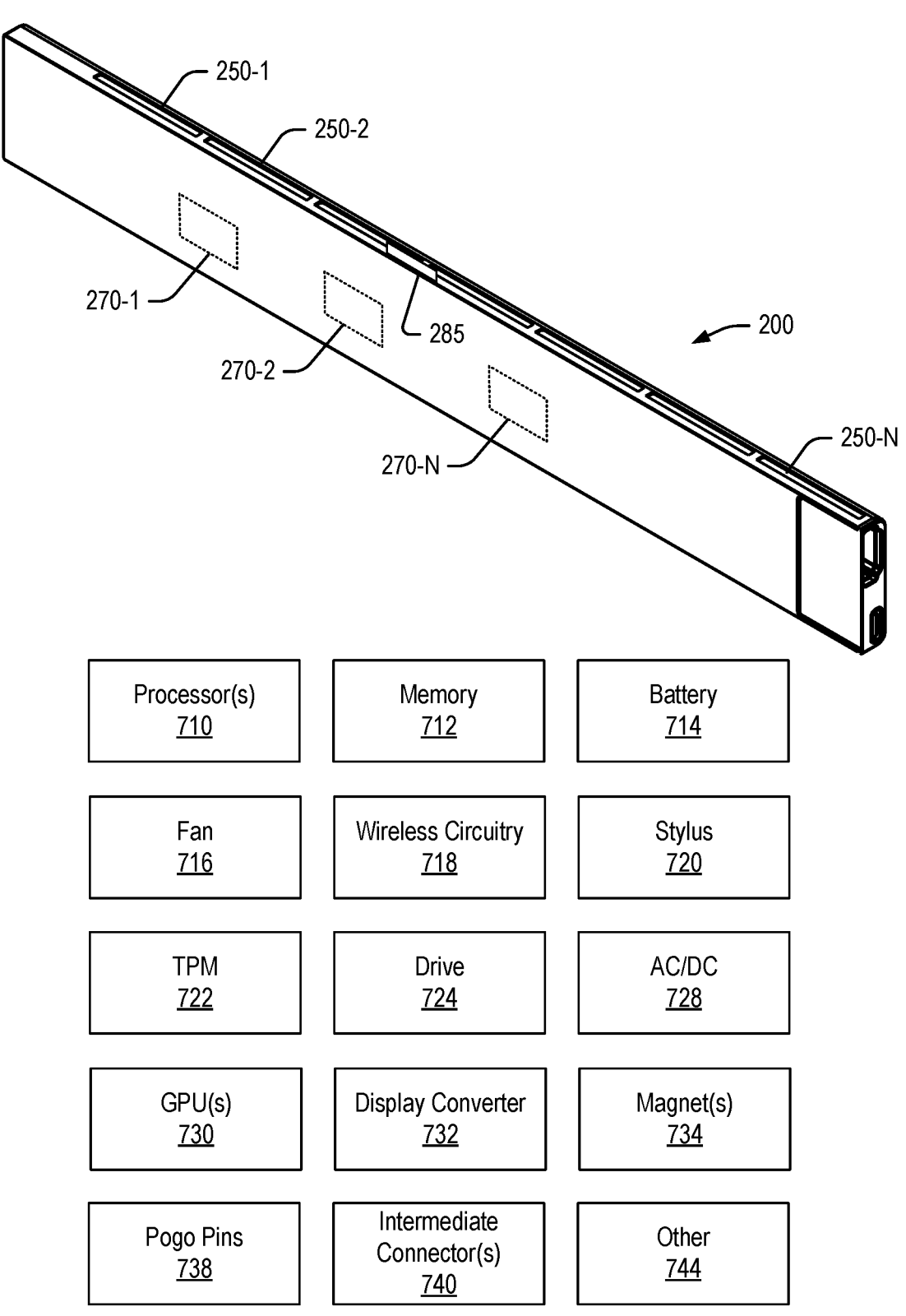
FIG. 7 is a perspective view of an example of a bar mountable to a computing device.

FIG. 7 shows a perspective view of the bar 200 with various features such as, for example, one or more vents 250-1, 250-2, . . . , 250-N, one or more components 270-1, 270-2, . . . , 270-N, an interface and/or latch component 285. As an example, the one or more vents 250-1, 250-2, . . . , 250-N may provide for heat transfer (e.g., cooling). As to the one or more components 270-1, 270-2, . . . , 270-N, these may include one or more of one or more processors 710, memory 712, one or more batteries 714, one or more fans 716, wireless circuitry 718, a stylus 720 (e.g., removably seated), a trusted platform module (TPM) 722, a drive 724, AC/DC circuitry 728, one or more GPUs, one or more display converters 732, one or more magnets 734, one or more pogo-pin interfaces 738, one or more intermediate connectors and/or one or more other components 744. As an example, one or more of the components or features in the examples of FIG. 7 may be present in a bar and/or in a unit that can be coupled to the bar. For example, a unit may include one or more processors (e.g., CPUs, GPUs, etc.) memory, one or more batteries, one or more fans, wireless circuitry, a TPM, conversion circuitry, etc. As an example, a computing device may be customizable via one or more bars and/or one or more units that may attach to one or more of the bars.

As an example, wireless circuitry may include one or more types of wireless circuitry such as, for example, cellular circuitry, satellite circuitry, WiFi circuitry, BLUETOOTH circuitry, etc. As an example, a bar and/or a unit that can be coupled to the bar may include one or more subscriber features such as, for example, cellular, satellite, etc., subscriber features (e.g., consider a SIM card, etc.).

As an example, a bar may include features for coupling to multiple units, which may be at opposing ends of the bar and/or stacked at one end of the bar. As to the latter, consider a unit that can be coupled to a bar on one side and that can receive another unit on another, opposing side (e.g., consider USB-C type of port/connector coupling(s), etc.). In such an example, the additional unit may extend outwardly from a side edge of a computing device and/or the bar and/or one or more of the units may provide for translation such that an end of the additional unit may be moved inwardly and/or outwardly, optionally inwardly to be even and/or recessed from an edge of the computing device.

As an example, the interface and/or latch component 285 may provide for interaction with the latch 180 of the base housing 120 and/or the interface 185 of the base housing 120. As an example, the latch 180 may provide for securing the bar 200 in the recess 125 of the base housing 120 and, for example, for operatively coupling circuitry of the bar 200 and circuitry of the base housing 120.

As to the one or more magnets 734, consider, for example, a computing device that includes a base housing and a bar that can be coupled via a magnetic attraction force using the one or more magnets. As an example, a bar and an adjustable port end may include one or more magnets. For example, consider a bar with an adjustable port end that may be translatable and/or removably attachable where translation, attachment and/or detachment may be facilitated by magnetic force or forces, which may include one or more of an attraction force and a repulsion force. As an example, a removably attachable adjustable port end may include one or more magnets and/or one or more ferromagnetic materials that can generate a magnetic attraction force with an end of a bar that includes one or more ferromagnetic materials and/or one or more magnets.

As an example, a computing device can include a processor; memory accessible to the processor; a display housing that includes a display operatively coupled to the processor; a base housing that includes a base side, a top side, a front edge, a back edge, a left edge, and a right edge; a hinge assembly that couples the base housing and the display housing; and a bar mountable to the base side of the base housing, where the bar includes one or more feet and an adjustable port end that includes one or more ports. In such an example, the adjustable port end may be slidably adjustable in a direction toward and away from one of the left edge and the right edge of the base housing.

As an example, an adjustable port end may be slidably adjustable a distance less than 6 cm and greater than 0.2 cm.

As an example, an adjustable port end may be slidably adjustable from a flush position flush with one of the left edge and the right edge of a base housing to a recessed position recessed from the one of the left edge and the right edge of the base housing.

As an example, an adjustable port end may be footless (e.g., without a foot). In such an example, the adjustable port end may be movable without contacting a support surface on which a computing device is positioned.

As an example, an adjustable port end, as a unit, may be replaceably adjustable with a different adjustable port end, as another, different unit. For example, consider a unit that is selected from a number of different units where a user may select one of the units to customize a computing device, for example, as to one or more ports and/or one or more other features. As an example, an adjustable port end, as a unit, may include one or more female features and/or one or more male features. In such an example, consider one end of a unit as including at least one male feature that can plug into a receptacle (e.g., a port) of a bar and an opposing end as including at least one female feature that can be a receptacle (e.g., a port) for a connector. In such an example, one or more of data and/or power may be transmitted from one end to the other end of the unit where, for example, the unit may include circuitry that alters the data and/or power and/or that does not alter the data and/or power. As an example, a unit may include circuitry that receives data and/or power according to one standard and that transmits the data and/or power according to another standard (e.g., HDMI to other, DisplayPort to other, Ethernet to other, etc.).

As an example, a bar can include a fixed end opposite an adjustable port end where, for example, the fixed end may include one or more ports. As an example, a fixed end may be substantially flush with one of the right edge and the left edge of a base housing. As to substantially flush, it may be within approximately 1 cm of an edge, or, for example, within approximately 0.5 cm of an edge.

As an example, a processor may be disposed in a cavity of a bar. For example, a processor of a computing device may be disposed in a bar that may be detachable from a base housing of the computing device via one or more mechanisms (e.g., a mechanical latch, a magnetic attraction force, etc.). In such an example, the computing device may be customizable by selecting a bar from a number of different bars with different processors and/or numbers of processors.

As an example, a bar may include at least one vent. In such an example, the vent may provide for heat transfer, for example, via flow of air. In such an example, the flow of air may be via natural convection and/or via an air mover such as, for example, a fan or fans.

As an example, a computing device can include at least one magnet where a bar mounts to a base housing of the computing device via a magnetic attraction force.

As an example, a computing device can include an interface that includes a base housing portion and a bar portion that electrically couple circuitry of the bar to circuitry of the base housing. In such an example, the interface may be or include an electrical contact interface and/or the interface may be or include a wireless interface.

As an example, a computing device can include one or more batteries. As an example, a base housing of a computing device can include a base housing battery and a bar may include a bar battery, which may be within the bar and/or via a detachable component of the bar, which may be detachable from an end of the bar and which may include one or more ports. In such an example, the detachable component may be a unit that may be charged via one or more ports. As an example, such a unit may be detachable and utilized to power one or more other devices (e.g., consider an auxiliary battery for a cellular phone, etc.).

As an example, a bar may be selectable from a plurality of different bars. In such an example, each of the plurality of different bars may include different circuitry (e.g., at least one type of circuitry that differs).

As an example, a bar may include at least one intermediate serial bus connector that is inaccessibly covered upon connection to the adjustable port end (e.g., as unit). As explained, an adjustable port end may be a unit that may be attachable and detachable from a bar that is mounted to a computing system. As explained, a bar may include a fixed end that may include one or more ports and an adjustable port end that may include one or more ports or, for example, two adjustable port ends where each includes one or more ports. As explained, an adjustable port end may be an end of a unit removably attachable to a bar and/or otherwise translatable with respect to a bar.

As an example, a computer program product can include instructions to instruct a computing device, a computing system, etc., to perform one or more methods.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 8:
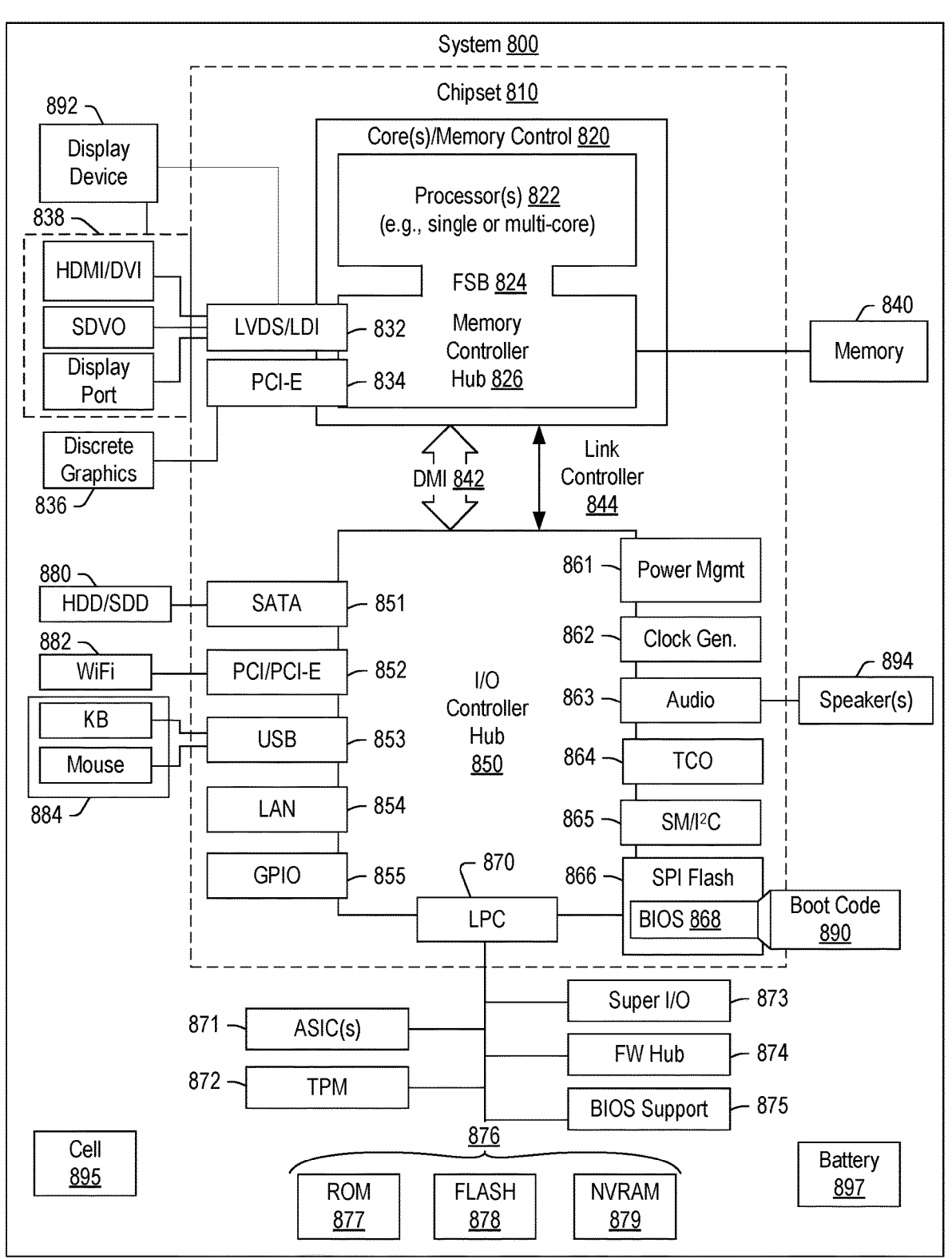
FIG. 8 is a diagram of an example of a system that includes one or more processors.

While various examples of circuits or circuitry have been discussed, FIG. 8 depicts a block diagram of an illustrative computer system 800. The system 800 may be a computer system, such as one of the ThinkCentre® or ThinkPad® series of personal computers sold by Lenovo (US) Inc. of Morrisville, NC, or a workstation computer system, such as the ThinkStation®, which are sold by Lenovo (US) Inc. of Morrisville, NC; however, as apparent from the description herein, a system or other machine may include other features or only some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., I²C, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an I²C interface (see, e.g., the SM/I²C interface 865), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A computing device comprising:
a processor;
memory accessible to the processor;
a display housing that comprises a display operatively coupled to the processor;
a base housing that comprises a base side, a top side, a front edge, a back edge, a left edge, and a right edge;
a hinge assembly that couples the base housing and the display housing; and
a bar mountable to the base side of the base housing, wherein the bar comprises one or more feet and an adjustable port end that comprises one or more ports, and wherein the adjustable port end is replaceably adjustable with a different adjustable port end.

2. The computing device of claim 1, wherein the adjustable port end is slidably adjustable in a direction toward and away from one of the left edge and the right edge of the base housing.

3. The computing device of claim 1, wherein the adjustable port end is slidably adjustable a distance less than 6 cm and greater than 0.2 cm.

4. The computing device of claim 1, wherein the adjustable port end is slidably adjustable from a flush position flush with one of the left edge and the right edge of the base housing to a recessed position recessed from the one of the left edge and the right edge of the base housing.

5. The computing device of claim 1, wherein the adjustable port end is footless.

6. The computing device of claim 1, wherein an end of the bar opposite the adjustable port end comprises one or more ports.

7. The computing device of claim 1, wherein the processor is disposed in a cavity of the bar.

8. The computing device of claim 1, wherein the bar comprises at least one vent.

9. The computing device of claim 1, comprising at least one magnet wherein the bar mounts to the base housing via a magnetic attraction force.

10. The computing device of claim 1, comprising an interface that comprises a base housing portion and a bar portion that electrically couple circuitry of the bar to circuitry of the base housing.

11. The computing device of claim 10, wherein the interface comprises an electrical contact interface.

12. The computing device of claim 10, wherein the interface comprises a wireless interface.

13. The computing device of claim 1, wherein the adjustable port end comprises an end of a unit removably attachable to the bar.

14. The computing device of claim 1, wherein the base housing comprises a base housing battery and wherein the bar comprises a bar battery.

15. The computing device of claim 1, wherein the bar is selectable from a plurality of different bars.

16. The computing device of claim 15, wherein each of the plurality of different bars comprises different circuitry.

17. The computing device of claim 1, wherein the bar comprises at least one intermediate serial bus connector that is inaccessibly covered upon connection to the adjustable port end.

18. A computing device comprising:
a processor;
memory accessible to the processor;
a display housing that comprises a display operatively coupled to the processor;
a base housing that comprises a base side, a top side, a front edge, a back edge, a left edge, and a right edge;
a hinge assembly that couples the base housing and the display housing;
a bar mountable to the base side of the base housing, wherein the bar comprises one or more feet and an adjustable port end that comprises one or more ports; and
at least one magnet wherein the bar mounts to the base housing via a magnetic attraction force.

19. A computing device comprising:
a processor;
memory accessible to the processor;
a display housing that comprises a display operatively coupled to the processor;
a base housing that comprises a base side, a top side, a front edge, a back edge, a left edge, and a right edge;
a hinge assembly that couples the base housing and the display housing; and
a bar mountable to the base side of the base housing, wherein the bar comprises one or more feet and an adjustable port end that comprises one or more ports, and wherein the bar comprises a fixed end opposite the adjustable port end.

20. A computing device comprising:
a processor;
memory accessible to the processor;
a display housing that comprises a display operatively coupled to the processor;
a base housing that comprises a base side, a top side, a front edge, a back edge, a left edge, and a right edge;
a hinge assembly that couples the base housing and the display housing; and
a bar mountable to the base side of the base housing, wherein the bar comprises one or more feet and an adjustable port end that comprises one or more ports, and wherein the adjustable port end is slidably adjustable from a flush position flush with one of the left edge and the right edge of the base housing to a recessed position recessed from the one of the left edge and the right edge of the base housing.

* * * * *